(12) United States Patent
Son et al.

(10) Patent No.: US 7,652,692 B2
(45) Date of Patent: Jan. 26, 2010

(54) APPARATUS AND METHOD FOR PHOTOGRAPHING A MOVING PICTURE

(75) Inventors: Jae-Gon Son, Daegu (KR); Kang-Wook Kim, Daegu (KR); Soon-Shik Hwang, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 582 days.

(21) Appl. No.: 10/975,341

(22) Filed: Oct. 29, 2004

(65) Prior Publication Data

US 2005/0094000 A1 May 5, 2005

(30) Foreign Application Priority Data

Oct. 31, 2003 (KR) .................. 10-2003-0076811

(51) Int. Cl.
*H04N 5/76* (2006.01)
(52) U.S. Cl. .................. 348/231.2; 348/231.99; 348/231.9
(58) Field of Classification Search ............ 348/231.99, 348/231.2, 220.1, 231.9, 61, 14.01, 231.1, 348/231.3, 231.7, 335; 455/550.1, 557.3; 386/52, 96
See application file for complete search history.

(56) References Cited

U.S. PATENT DOCUMENTS 6,035,093 A * 3/2000 Kazami et al. ............... 386/52
6,396,924 B1 * 5/2002 Suso et al. ............. 379/433.13
6,950,126 B1 * 9/2005 Homma et al. ......... 348/211.99
7,408,581 B2 * 8/2008 Gohda ................... 348/333.05
2004/0023685 A1 * 2/2004 Nakamura ............... 455/550.1
2004/0027474 A1 * 2/2004 Aoyama et al. ............. 348/335

* cited by examiner

*Primary Examiner*—Nhan T Tran
*Assistant Examiner*—Ahmed A Berhan
(74) *Attorney, Agent, or Firm*—Roylance, Abrams, Berdo & Goodman, L.L.P.

(57) ABSTRACT

An apparatus and method for storing moving picture signals in the apparatus equipped with a camera. The method includes the steps of entering a preview mode for enabling the moving picture signals photographed by the camera to be displayed when the camera is powered; coding the photographed moving picture signals and storing the coded moving picture signals in an image memory when a storage key is input in the preview mode; shifting to the preview mode when a temporary pause key is input in a first moving picture storage mode in which the moving picture signals are stored and entering a second moving picture storage mode in which the moving picture signals stored in the image memory are converted to moving picture files and stored; returning to the first moving picture storage mode when the storage key is input in the preview mode; and linking the stored moving picture files to generate one moving picture file and storing the moving picture file, when a record end key is input in the preview mode or the first moving picture storage mode.

13 Claims, 8 Drawing Sheets

APPARATUS AND METHOD FOR PHOTOGRAPHING A MOVING PICTURE

PRIORITY

This application claims the benefit under 35 U.S.C. 119(a) of an application entitled "Method for photographing moving picture" filed in the Korean Intellectual Property Office on Oct. 31, 2003 and assigned Serial No. 2003-76811, the entire contents of which are incorporated herein by reference.

BACKGROUND OF THE INVENTION

1. Field of the Invention

The present invention relates to an apparatus and method for recording moving picture signals. More particularly, the present invention relates to an apparatus and method for synthesizing and recording moving picture signals.

2. Description of the Related Art

Generally, an image processing apparatus includes a camera for photographing an image and a display module for displaying an image signal photographed by the camera. Herein, the camera may use a charge coupled device (CCD) or a complementary metal-oxide semiconductor (CMOS) sensor and the display module may use a liquid crystal display ('LCD'). With the miniaturization of the camera device, a device for photographing the image is also miniaturized. Further, many miniaturized digital cameras have become popular. Additionally, the aforementioned camera device has been mounted on a portable terminal. The portable terminal can photograph an image, convert the photographed image to a moving picture or a still picture, and display the moving picture or the still picture. Further, the portable terminal can transmit the photographed image to a base station.

An apparatus equipped with a camera as described above must include a large memory capacity for storing the photographed image data. In particular, in order to photograph moving picture signals, digital camera devices and portable terminals using external expanded memories have come into the market. Further, the aforementioned camera devices and portable terminals have required a large memory capacity for storing moving picture data photographed by cameras. However, when the memory is completely filled with the moving picture data, a photographing function is disabled.

Usually, when moving picture signals are recorded, photographing is performed while a recording operation and a stop operation are repeated. This is because the capacity of a memory (storage device) is limited. That is, when moving picture signals are recorded, a large memory capacity is required. Accordingly, in order to efficiently use the memory in a recording mode, the moving picture signals are recorded while a recording operation and a stop operation are repeated. When the moving picture signals are recorded as described above, a plurality of moving picture files are generated. Accordingly, the moving picture files are stored in memory. Herein, the user of a camera device must reproduce the recorded moving picture signals one by one. Accordingly, it is preferred that the separately recorded moving picture files as described above are synthesized into one moving picture file. Further, it is necessary to provide a method for erasing an undesired portion while reproducing the recorded moving picture signals and generating desired moving picture signals.

Further, if a portable terminal is equipped with the camera device, an incoming call may occur while the moving picture signals are being photographed. Herein, when the incoming call occurs while the photographed moving picture signals are being recorded, a termination alert may be stored in the recorded moving picture signals. Accordingly, when the incoming call occurs while the moving picture signals are being photographed, it is preferable to indicate the occurrence of the incoming call so that the user can selectively process the incoming call.

SUMMARY OF THE INVENTION

Accordingly, the present invention has been made to solve the above-mentioned problems occurring in the prior art, and it is an object of the present invention to provide an apparatus and method capable of recording moving picture signals in an apparatus equipped with a camera.

It is another object of the present invention to provide an apparatus and method for recording moving picture signals while a record and a temporary pause function are repeated when the moving picture signals are recorded in an apparatus equipped with a camera and synthesizing the recorded moving picture signals into one moving picture file when the recording is terminated.

It is further another object of the present invention to provide an apparatus and method for editing recorded moving picture files by erasing moving picture signals based on a an interval set by a user while the moving picture file is being reproduced in an apparatus equipped with a camera.

It is still another object of the present invention to provide an apparatus and method for silently indicating the occurrence of an incoming call when the incoming call occurs during the record of moving picture files in an apparatus equipped with a camera, and controlling a moving picture record mode by a user's selection.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
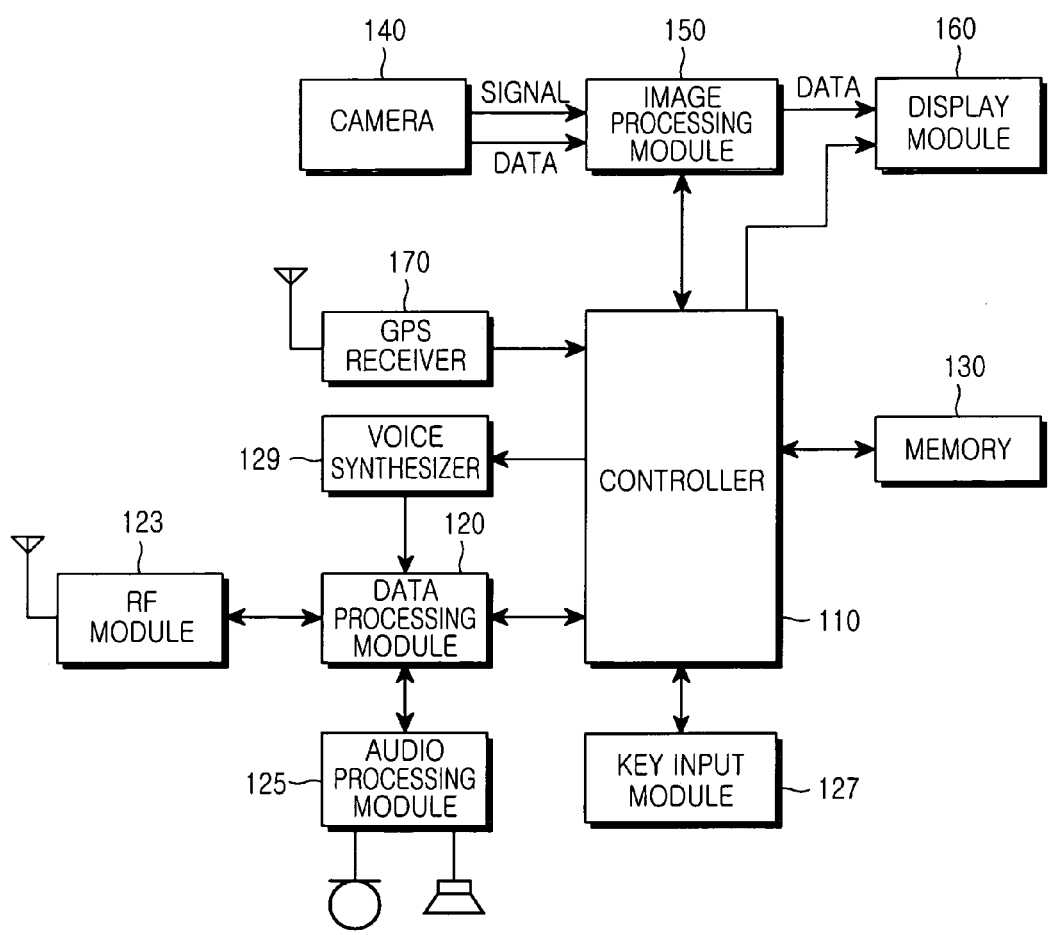
FIG. 1 is a block diagram illustrating the construction of a moving picture photographing apparatus according to an embodiment of the present invention.

Embodiments of the present invention will now be described with reference to the accompanying drawings. The same reference numerals are used to designate the same elements throughout the figures.

When a portable terminal equipped with a digital camera or a camera records moving picture signals, moving picture photographing may be limited due to the capacity of a memory device. Accordingly, in recording the moving picture, the moving picture signals are intermittently photographed, the moving picture signals intermittently photographed in this manner are synthesized into one moving picture file, and the moving picture file is stored. In photographing the moving picture as described above, when moving picture signals of a required interval are intermittently recorded, the intermittently recorded moving picture signals are edited into one moving picture file, and the moving picture file is stored, the use efficiency of a memory storing the moving picture file can be improved and the recording performance of the moving picture file can also be improved. In an embodiment of the present invention, a moving picture is photographed for a desired time period while a record operation and a stop operation are repeated in photographing the moving picture, and the moving picture signals photographed in this manner can be stored as one moving picture file. Further, in another embodiment of the present invention, one moving picture file is recorded when photographing a moving picture. Then, in reproducing the moving picture file, the moving picture file is edited by a user, and a moving picture file of a undesired interval can be erased from the recorded moving picture file. Furthermore, in another embodiment of the present invention, when an incoming call occurs while moving picture signals are being intermittently photographed in a portable terminal having a communication function, the occurrence of the incoming call is reported non-audibly. Accordingly, a user can selectively process the incoming call while the moving picture is recorded.

A moving picture signal photographing method according to an embodiment of the present invention can be applied to an apparatus equipped with a digital camera having a photographing function. In an embodiment of the present invention, a portable terminal equipped with the camera will be described as an example.

FIG. 1 is a block diagram showing the construction of a portable terminal according to an embodiment of the present invention and the construction may be the construction of a portable phone or mobile terminal.

Referring to FIG. 1, a radio frequency (RF) module 123 performs a wireless communication function for a portable phone. The RF module 123 includes an RF transmitter for up-converting and amplifying the frequency of a transmitted signal, and an RF receiver for low-noise amplifying a received signal and down-converting the frequency of the received signal, etc. A data processing module 120 includes a transmitter for coding and modulating the transmitted signal, a receiver for demodulating and decoding the received signal, etc. The data processing module 120 may comprise a modem and a codec. Herein, the codec includes a data codes processing packet data, etc and an audio codec for processing an audio signal such as voice. An audio processing module 125 performs a function of reproducing a received audio signal output from the audio codec of the data processing module 120 or transmitting a transmission audio signal generated from a microphone to the audio codec of the data processing module 120. A voice synthesizer 129 performs a function of converting a voice message reporting that photographing is being performed into a voice signal when an incoming call occurs while the mobile terminal is photographing an object.

A key input module 127 includes keys for inputting numerals and text information and function keys for setting various functions. Further, the key input module 127 may include function keys for controlling a moving picture mode, a photographing key driving a camera, and a storage key according to an embodiment of the present invention.

A memory 130 may include a program memory, a data memory, and a moving picture memory for storing image signals generated and received according to an embodiment of the present invention. The program memory may store programs for controlling the general operation of a portable phone and programs for controlling the path of an image signal applied to a display module 160 according to an embodiment of the present invention. Further, the data memory performs a function of temporarily storing data generated while the programs are executed.

A controller 110 performs a function of controlling the general operation of a portable phone. Further, the controller 110 may include the data processing module 120. That is, in the case of a portable phone, the controller 110, the data processing module 120, the audio processing module 125 and the voice synthesizer 129 may be integrated to one MSM chip. The controller 110 may set an incoming voice guidance mode according to an embodiment of the present invention. Further, the controller 110 may perform a silent termination alert when an incoming call occurs in a moving picture signal storage mode, transmit a preset incoming rejection guidance message to the caller when a user rejects an incoming call, and end the processing of the incoming call.

A camera module 140 includes a camera sensor for converting an optical signal detected during photographing an image and converting the optical signal into an electrical signal and a signal processing unit for converting an analog image signal photographed by the camera sensor into digital data. Herein, it is assumed that the camera sensor is a CCD sensor and the signal processing unit may comprise a digital signal processor (DSP). Further, the camera sensor may be integrated with the signal processing unit or the camera sensor may be constructed separately from the signal processing unit.

An image processing module 150 performs a function of generating screen data for displaying the image signal outputted from the camera module 140. The image processing module 150 processes the image signal output from the camera module 140 by the frame and outputs frame image data in accordance with the characteristic and the size of the display module 160. Further, the image processing module 150 includes an image codec and the image codec performs a function of coding an image signal by a set scheme or decoding coded frame image data into the original frame image data. Furthermore, the image processing module 150 performs a function of generating and reproducing a moving picture signal according to a mode set under the control of the controller 110.

The display module 160 displays the frame image signal output from the image processing module 150 on a screen and displays user data output from the controller 110. Further, the display module 160 displays the moving picture signal reproduced under the control of the controller 110. Herein, the display module 160 may use a liquid crystal display (LCD). In such a case, the display module 160 may include an LCD controller, a memory capable of storing image data, an LCD display device, etc. Herein, when the LCD has a touch screen function, the display module 160 may operate as an input module.

A global positioning system ('GPS') receiver 170 receives GPS information from a GPS satellite for transmitting the received GPS information to the controller 110. Herein, the GPS information may comprise information on the current position of a portable phone. In an embodiment of the present invention, position information and time information relating to the acquisition of a current moving picture can be received through the GPS receiver 170.

Referring to FIG. 1, when a user performs a dialing operation through the key input module 127 in originating a call, the controller 110 detects the dialing operation, processes the dialed information received through the data processing module 120, converts the processed dial information into an RF signal through the RF module 123, and outputs the RF signal. Then, when a called party responds, the controller 110 detects the response of the called party through the RF module 123 and the data processing module 120. Then, the controller 110 establishes a communication path including the RF module 123, the data processing module 120 and the audio processing module 125 and performs a communication function.

Further, for an incoming call, the controller 110 detects an incoming request through the data processing module 120 and alerts a user to the incoming call. Herein, when the portable phone is in a moving picture photographing mode, the controller 110 displays the information of a calling party on the display module 160 and simultaneously flickers an incoming lamp to alert the user to the occurrence of an incoming call. The reason for performing silent termination alert in this manner is because the incoming bell sound is recorded when the incoming bell occurs in a photographing state and the shaking of an image signal being photographed may occur when a vibration mode is performed. Further, when a guidance function is set in while in the photographing mode, the controller 110 can output a voice signal reporting that the user cannot answer the telephone to the caller through the voice synthesizer 129.

Further, when the user presses a communication key in response to the incoming call, the controller 110 stops photographing a moving picture and processes the incoming call. Herein, the image processing module 150 temporarily pauses the storage of moving picture signals according to the processing of the incoming call, converts moving picture signals photographed and stored up to the pause to a file and stores the file. Further, when the processing of the incoming call ends, the controller 110 shifts to a preview state and displays a screen containing an image that was previously photographed. When the user reenters a record mode, the controller 110 notifies the image processing module 150 of the performance of the record mode. Then, the image processing module 150 codes and stores the moving picture signals photographed by the camera module 140. When a moving picture storage mode is terminated, the controller 110 notifies the image processing module 150 of the termination of the moving picture storage mode. The image processing module 150 synthesizes a previous moving picture file generated by the processing of the incoming call and a moving picture file currently photographed and stored into one moving picture file, and stores the moving picture file. Accordingly, in the portable terminal according to the embodiment of the present invention, when an incoming call is processed while moving picture signals are being recorded, a moving picture file generated before the processing of the incoming call and a moving picture file generated after the processing of the incoming call are edited into one moving picture file, and the moving picture file is stored. Herein, the above description employs the incoming call as an example, but the same application can be accomplished for an originating call and an incoming/originating data service.

Further, in a portable terminal equipped with a digital camera or a camera, when a recording operation is temporarily paused while moving picture signals are being recorded as described above, the image processing module 150 synthesizes moving picture files generated by the temporary pause into one moving picture file and stores the moving picture file when the recording is terminated. That is, when a user selects a temporary pause function while the moving picture signals are recorded during a record mode, the image processing module 150 temporarily stops the record operation, converts the moving picture signals having been stored before the temporary pause to one moving picture file and stores the moving picture file. Further, the image processing module 150 displays photographed moving picture signals on the display module 160 during a preview mode during a period for which the temporary pause function has been set. When a user presses a storage key again while the preview mode is temporarily performed as described above, the image processing module 150 stores photographed moving picture signals again. As described above, when the record operation and the temporary pause function are repeated, the image processing module 150 converts the recorded moving picture signals to each moving picture file. Then, when the user selects the record end function of a moving picture signal, the image processing module 150 converts a plurality of moving picture files generated after the record has started to one moving picture file and stores the moving picture file.

Furthermore, in a portable terminal equipped with a digital camera or a camera, moving picture signals of an undesired interval can be erased while a recorded moving picture file is reproduced. That is, when a user selects the reproduction function of the stored moving picture file, the image processing module 150 decodes the selected moving picture file and reproduces the decoded moving picture file on the display module 160. Herein, when the user selects the erasure function of a moving picture signal and sets an erasure interval, the image processing module 150 converts moving picture signals remaining after deleting moving picture signals of the selected erasure interval to one moving picture file and stores the moving picture file.

Hereinafter, the storage method of a moving picture signal according to the embodiment of the present invention as described above will now be described.

Figure 2:
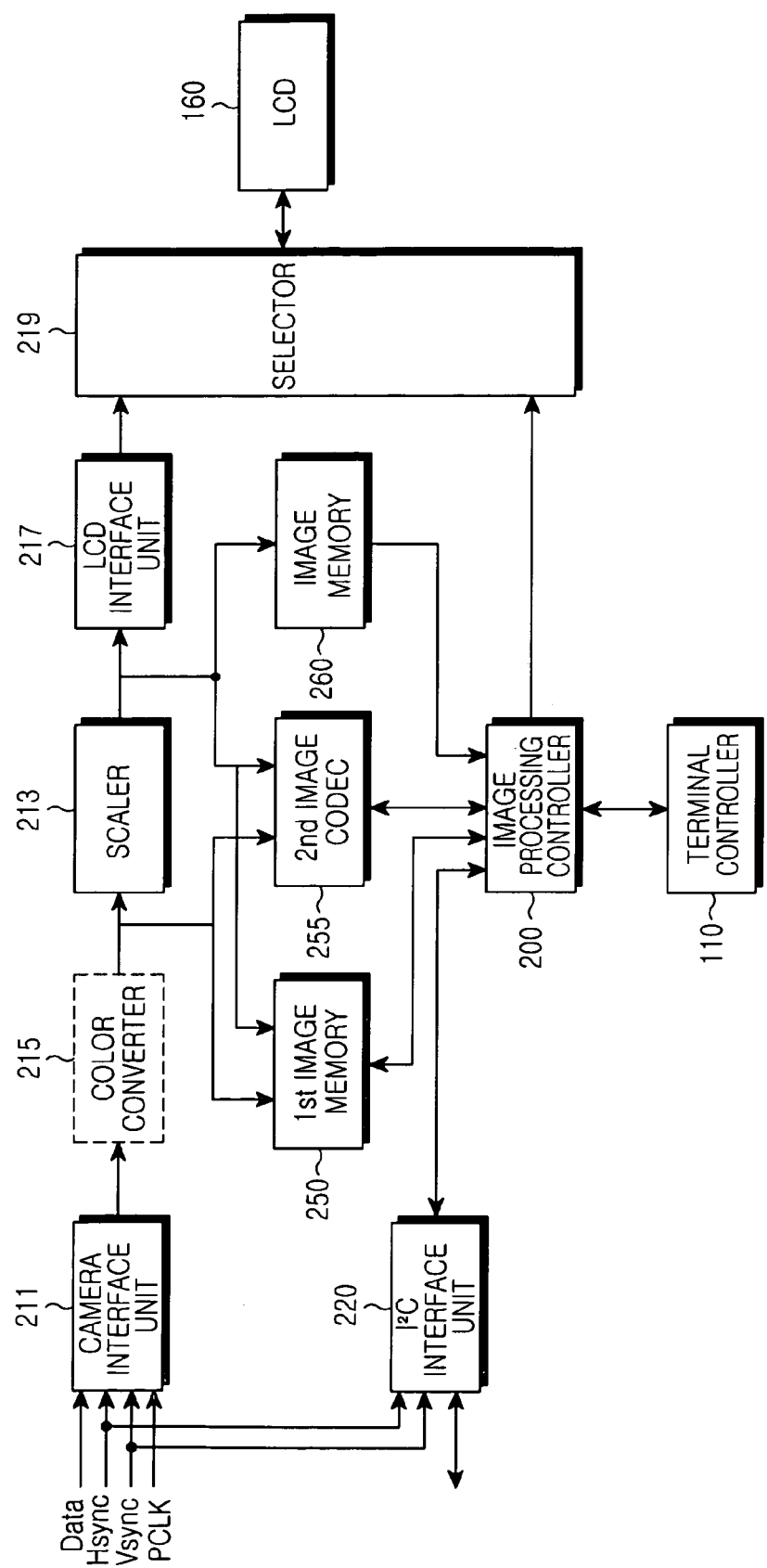
FIG. 2 is a block diagram illustrating the construction of the image processing module of FIG. 1.

FIG. 2 is a block diagram illustrating the image processing module 150 according to the embodiment of the present invention. The image processing module 150 interfaces image signals between the camera module 140 and the display module 160 and performs a function of coding and decoding the image signals input from the camera module 140. Further, the image processing module 150 performs a function of decimating and cropping the pixels and the lines of the image data of a coded main screen and generating a small screen. As described above, the image processing module 150 includes a first and a second image codec 250 and 255 for coding and decoding the image signals. In the embodiment of the present invention, a description will be given on an assumption that the first image codec 250 is an MPEG codec and the second image codec 255 comprise a Joint Picture Experts Group (JPEG) codec.

Referring to FIG. 2, a camera interface unit 211 performs a function of interfacing image data output from the camera module 140. Herein, it is assumed that the image data output from the camera module 140 are image data of a luminance and chrominance (YUV) format and the display module 160 displays image data of a Red Green Blue (RGB) format. In an embodiment of the present invention, it is assumed that the image data output from the camera module 140 have a YUV format and the display module 160 displays the image data of the RGB format.

A scaler 213 scales image signals photographed by the camera module 140 according to a control signal output from the controller 110 so that the image signals can be displayed on the display module 160. The scaler 213 reduces and crops the pixels of the image signals output from the camera module 140 to be the number of pixels of image signals capable of being displayed on the display module 160. However, if the display module 160 can display image data having a size larger than that of the image data output from the camera module 140, the scaler 213 can be designed to enlarge and display the image signals output from the camera module 140 under the control of the controller 110. According to a method for enlarging and displaying the image signals, pixels are selected from among the pixels of the image signals output from the camera module 140 by the number of pixels of image signals capable of being displayed on the display module 160, and the selected pixels displayed on the display module 160.

A color converter 215 converts YUV data output from the scaler 213 to RGB data and outputs the RGB data. Herein, when the camera module 140 can convert photographed image data to RGB data or the display module 160 can display image data of a YUV format, the color converter 215 may be omitted.

A LCD interface unit 217 performs a function of interfacing the image data to the display module 160. The LCD interface unit 217 includes a buffer therein and can perform a function of buffering the image data interfaced to the display module 160.

The first and the second image codec 250 and 255 can perform a function of coding the photographed image data or restoring the coded image data under the control of an image processing controller 200. The first image codec 250 inputs and performs Motion Picture Experts Group (MPEG) coding for the camera image signals output from the color converter 215 or the image signals displayed on the display module 160 under the control of the image processing controller 200. Further, the first image codec 250 decodes the MPEG-coded image signals and outputs the decoded image signals to the scaler 213 or the LCD interface unit 217. That is, the first and the second image codec 250 and 255 can code and decode the camera images or the displayed images.

The image processing controller 200 controls the generation operation of the image processing module 150. That is, the image processing controller 200 controls the display module 160 under the control of the controller 110 and controls the generation operation for displaying the image data photographed by the camera module 140. Herein, the image processing controller 200 can directly process the key data input from the key input module 127 in the image processing. In an embodiment of the present invention, the controller 110 confirms the key input generated from the key input module 127. When the key input is key data relating to the image processing, the controller 110 transmits the key input to the image processing controller 200 and the image processing controller 200 performs commands regarding the image processing.

Further, the memory 130 of FIG. 1 may have a function of storing the image data processed by the image processing module 150 and the image processing module 150 may have an image memory therein and store image data in the image memory. In an embodiment of the present invention, it is assumed that the image processing module 150 includes an image memory 260 therein. Then, in a storage mode, the image processing controller 200 codes the image data photographed by the camera module 140 through the first image codec 250 or the second image codec 255 and stores the coded image data in the image memory 260. Further, in a reproduction mode, the image processing controller 200 accesses the image memory 260, applies selected image data to the first image codec 250 or the second image codec 255 so that the image data are decoded and, finally enables the decoded image data to be output to and displayed on the display module 160.

A selector 219 performs a function of selecting the data output from the image processing module 150 or the data output from the controller 110 by a path control signal output from the controller 110 and outputting the selected data to the display module 160.

Referring to FIG. 2, in an image photographing mode, the controller 110 transfers a control right of an image processing to the image processing controller 200. Then, the image processing controller 200 enables user data sent from the controller 110 to be displayed on the display module 160. Besides, the image processing controller 200 controls an operation enabling image data photographed by the camera module 140 to be displayed on the display module 160 and an operation enabling image signals photographed by the command of a user to be stored in the memory 130. That is, the controller 110 controls an operation relating to communication and controls the operation of the display module 160 only when a communication function is performed. In contrast, in a standby state in which a communication function is not performed, it is assumed that the image processing controller 200 controls the general operation of the display module 160. That is, when the operation of the camera module 140 is selected, the image processing controller 200 controls the general operation of the portable terminal.

Hereinafter, an operation in which the image data photographed by the camera module 140 are transmitted to the display module 160 will be described. The image processing module 150 controls the transmission rate of moving picture data photographed by the camera module 140 and stores input image data in the memory of the display module 160 through the LCD interface unit 217. Herein, the size of image data of one frame output from the camera module 140 may be different from the number of pixels of one frame image data _capable of being displayed on the display module 160. Accordingly, the scaler 213 of the image processing module 150 can erase some of the pixels of the image data output from the camera module 140 so that the image data can be displayed on the display module 160, or can select a predetermined area including some of the pixels and zoom the selected area. The transmission rate of moving picture data is fixedly determined on the basis of a master clock. However, the flow of an image signal to the camera module 140, the image processing module 150 and the display module 160 is limited by the access speed of the display module 160. Accordingly, in order to adjust a reading speed from the camera module 140 and a writing speed to the display module 160, the LCD interface unit 217 includes a buffer therein and can temporarily perform buffering.

Further, in the course of displaying the image signals photographed by the camera module 140 on a moving picture screen of the display module 160, a user can store the displayed image signals. That is, the user can store the displayed image signals by means of the photographing key of the key input module 127. Herein, when a storage command occurs, the image processing controller 200 controls the first image codec 250 to code the image signals photographed by the camera module 140 and enables the coded data to be stored in the memory 130.

Figure 3:
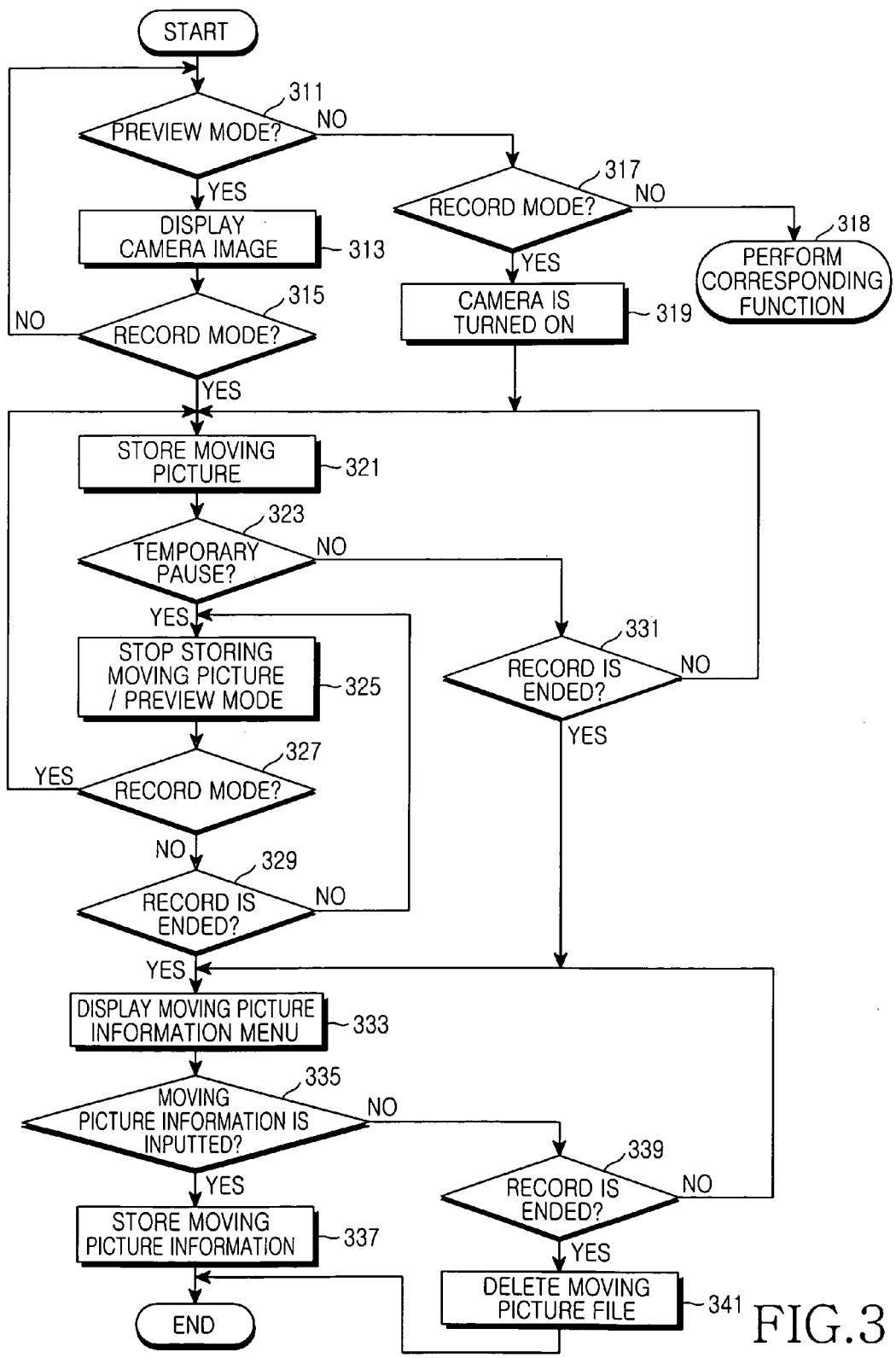
FIG. 3 is a flowchart illustrating a moving picture photographing procedure according to an embodiment of the present invention.

FIG. 3 is a flowchart illustrating a procedure of storing moving picture signals according to an embodiment of the present invention and FIG. 4 is a diagram illustrating the structure of a moving picture file generated while the moving picture storage procedure is performed according to an embodiment of the present invention. First, a procedure will be described, in which moving picture files are generated and stored while a storage and a temporary pause are repeated in a moving picture storage mode and the generated moving picture files are synthesized to be stored as one moving picture file after the temporary storage ends.

Hereinafter, the operation procedure of FIG. 3 will be described with reference to FIG. 4. In a method for performing a moving picture recording, a camera is first powered on to perform a preview mode and then a photographing operation can be performed. Otherwise, the photographing operation can be performed the moment the camera is powered on. If the image processing controller 200 detects that the camera is off and not in a preview mode in step 311, the method proceeds to step 317. At step 317, a determination is made as to whether the mobile terminal is in a record mode. If the mobile terminal is not in a record mode, the method proceeds to step 318 where other functions are performed. If the mobile terminal is in the record mode, the method proceeds to step 319 where the camera is powered on.

First, when a user turns on the camera, the image processing controller 200 detects that the camera is powered on and in a preview mode in step 311 and displays a camera image in step 313. In the preview mode, the image processing controller 200 performs an operation of displaying image signals photographed by the camera module 140 on the display module 160. Herein, the color converter 215 converts the image signals of a YUV format photographed by the camera module 140 to RGB signals. Then, the scaler 213 performs scaling for the image screen of the camera module 140 according to the size of the display module 160 and applies the scaled image screen to the display module 160. Accordingly, the image signals photographed by the camera module 140 are displayed on the display module 160 as a moving picture.

When the storage key of the key input module 127 is pressed in the preview mode as described above, the controller 110 detects that the storage key has been pressed and notifies the image processing controller 200 that the storage key has been pressed. Then, the image processing controller 200 detects that the portable terminal is in a record mode in step 315 and controls the first image codec 250 in step 321 so that the image signals output from the color converter 215 are subjected to MPEG coding. Further, the image processing controller 200 stores the MPEG coded moving picture signals in the image memory 260. Herein, since the first image codec 250 is an MPEG codec, an image signal of a first frame is compressed and coded into an I frame image and next frames are coded into a B frame or a P frame according to a predetermined method. Accordingly, when the moving picture storage key of the key input module 127 is pressed in the preview mode, the image processing controller 200 performs MPEG coding for the moving picture signals photographed by the camera module 140 and stores the MPEG coded moving picture signals in the image memory 260.

When the temporary pause key of the key input module 127 is pressed in such a state, the controller 110 detects that the temporary pause key has been pressed and outputs a temporary record pause command to the image processing controller 200. Then, the image processing controller 200 detects the record temporary pause command in step 323, controls the first image codec 250 in step 325 to stop the image coding operation, and stores image data stored in the image memory 260 as a moving picture file. Such a state becomes a state in which the record of the moving picture signals is temporarily stopped and the image processing module 150 performs a preview mode.

When the user presses the moving picture storage key again in a state in which the image processing module 150 performs the preview mode as described above, the controller 110 notifies the image processing controller 200 that the moving picture storage key has been pressed. The image processing controller 200 detects the notification of the controller 110 in step 327 and returns to step 321. That is, the image processing controller 200 stores photographed moving picture signals in the image memory 260. In step 321, since an image signal of a first frame is different from an image frame previously stored, the first image codec 250 compresses and codes the first frame into I frame image data and MPEG-codes the next frame image signals into a P frame or a B frame according to a predetermined method. That is, the image signal of the first frame recorded again after the temporary pause is compressed and coded into the I frame image. Further, the stored moving picture signals are stored as a moving picture file different from that before the temporary pause operation is performed. Herein, the image processing controller 200 generates header information so that the current stored moving picture file can be linked to an already stored moving picture file.

The storage operation and the temporary pause operation are repeated as described above, so that a plurality of moving picture files are generated and stored.

When the user presses the record end key of the key input module 127 while the above operations are repeated and the moving picture signals stored, the controller 110 notifies the image processing controller 200 that the record end key has been pressed. Then, the image processing controller 200 detects the notification of the controller 110 in step 329 or step 331, causes the operation of the first image codec 250 to be turned-off in step 333, and displays information for registering the name of the moving picture stored in the image memory 260. Herein, when the portable phone does not have the GPS receiver 170, the image processing controller 200 can display a menu for guiding an input of a moving picture photographing place/time and the name of the moving picture signals stored in the image memory 260. In contrast, when the portable phone has the GPS receiver 170, the image processing controller 200 can display a menu for guiding an input of the name of the moving picture signals stored in the image memory 260. Information on the menu can be generated by the image processing controller 200 or the controller 110 and the generated information is displayed on the display module 160 as user data.

When the name of the synthesized moving picture is input through the key input module 127 in a state in which the menu is displayed as described above, the image processing controller 200 detects the input of the name in step 335. Then, in step 337, the image processing controller 200 enables a name, a photographing place and time information corresponding to the moving picture stored in the image memory 260 to be input. Herein, the user can input only the name without inputting the photographing place and the time information. In such a case, when the user inputs the name and presses an ending key, the image processing controller 200 registers only the name through information input to a name menu by the ending key.

Further, in a state in which the input of moving picture information is guided in step 333, when the user generates a record cancel command, the image processing controller 200 detects the generation of the record cancel command in step 339. Then, the image processing controller 200 deletes the moving picture files stored in the image memory 260 in step 341 and ends the procedure.

As described above, in the moving picture signal photographing method according to an embodiment of the present invention, when one moving picture file is recorded, the record operation and the temporary pause operation are repeated and a plurality of moving picture files are thus generated and stored. Further, the moving picture files are synthesized into one moving picture file and the moving picture file is stored. Hereinafter, the moving picture file generation and storage procedure of the present invention as described above will be described in detail with reference to FIGS. 4A to 4C. Herein, it is assumed that the first image codec 250 is an MPEG 2 codec.

Figure 4A:
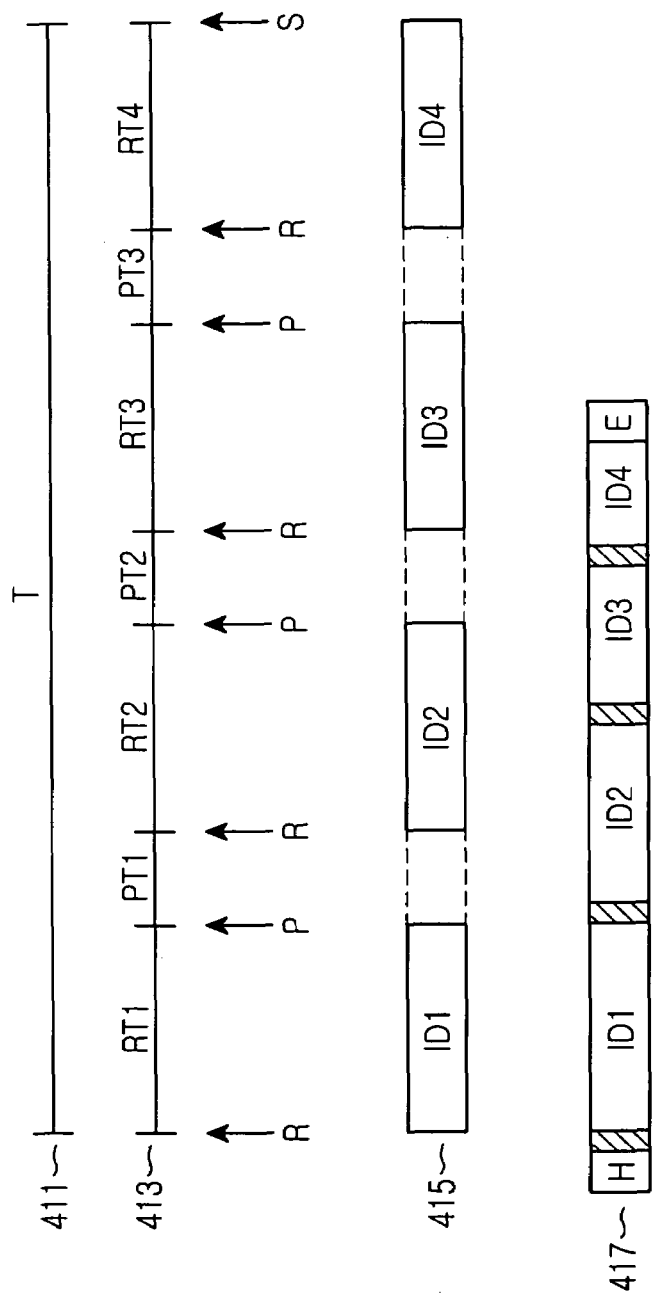
FIGS. 4A to 4C are diagrams illustrating the structure of moving picture signals photographed in a process of performing the procedure as shown in FIG. 3.
Figure 4B:
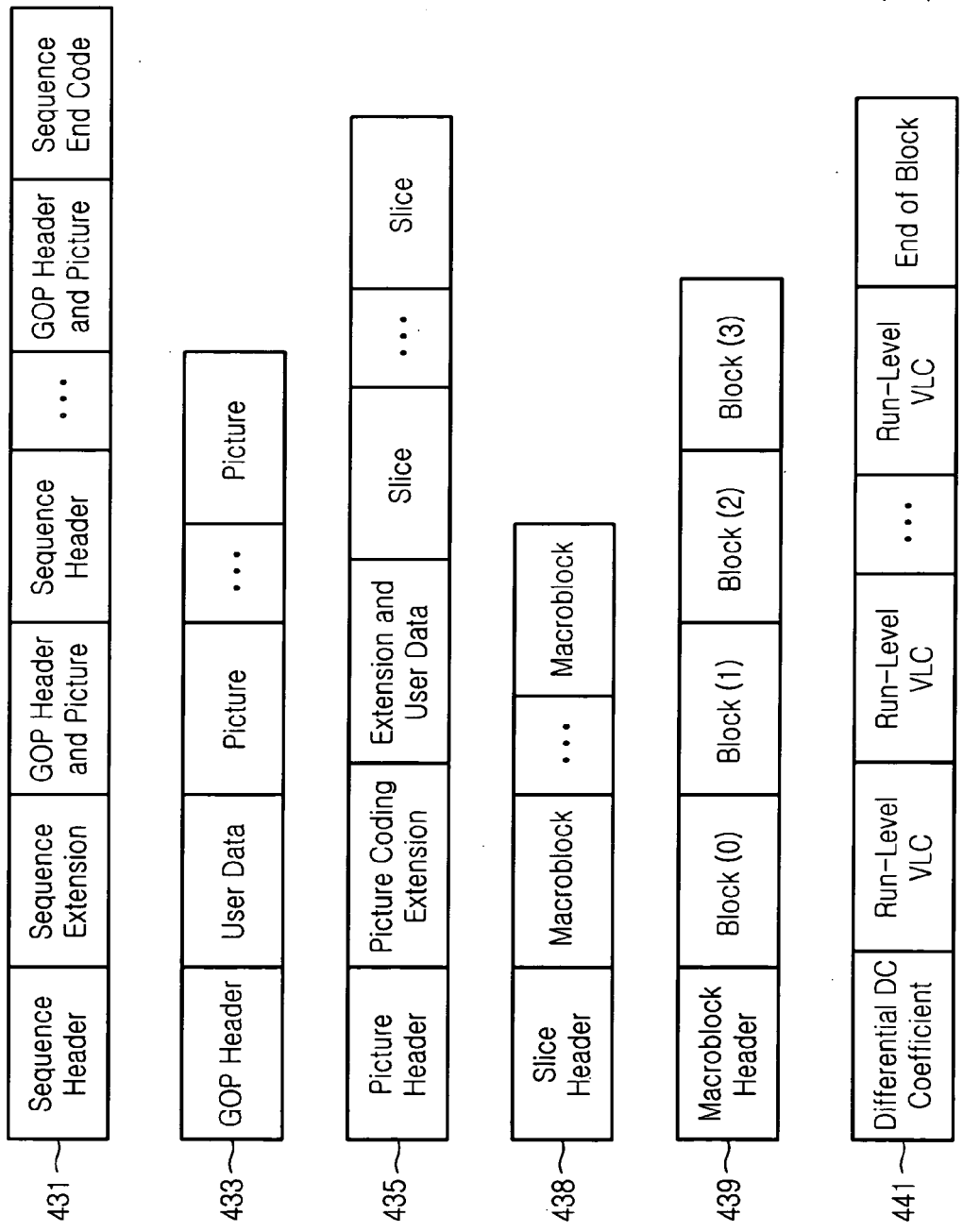

FIG. 4B is a view showing the structure of the moving picture file stored in the image memory 260.

Referring to FIG. 4B, a video sequence layer 431 is a screen group having a series of equal attributes. The sequence header of the video sequence layer 431 has a main function of enabling a reproduction from a predetermined point of a bit stream. That is, the sequence header stores the most basic and general information. After a sequence start code, the horizontal/vertical size of a screen, the aspect ratio of a pixel, a picture ration, a bit ratio, a video buffering verifier ('VBV') buffer size, a limited parameter flag, a flag loading two quantization matrices, etc., are contained.

A group of picture ('GOP') layer 433 is a minimum unit of a group of a screen which is a unit of a random access and has information for edition, a time from a sequence start, etc. After the start code, a time_code, a closed_GOP, a broken-_link player, etc., are contained.

A picture layer 435 includes a screen coding mode and a picture type which are common characteristics of one piece of screen. A D picture used in an MPEG-1 includes a screen having a DC component used in 'fast sending', 'fast sending backward', etc. The picture type includes an I picture, a P picture and a B picture. After the start code, a temporal reference representing a screen sequence of a GOP, a picture type, a VBV delay indicating the storage capacity of a virtual input buffer of an encoder or a decoder through a 90 KHz clock, a flag representing whether or not a motion vector has an integer unit, a frame gap (F-code) of a motion vector, etc., are contained.

A slice layer 438 includes a quantization characteristic value which is common information for a small screen which is to divide one piece of a screen by a predetermined length. A slice is a minimum unit of a series of data columns having a start code and is a band of a macroblock. The slice cannot be extended over several pictures. The first and the last macroblock cannot be skipped. However, in a case of a slice constructed by one macroblock, the macroblock can be skipped. Overlapping or skips between slices cannot be permitted and the vertical position of a slice is indicated by means of the macroblock address of a macroblock layer 439.

The macroblock layer 439 includes a motion compensation, a motion vector value, etc., which are common information of a pixel block obtained by dividing the slice layer. A stuffing of the predetermined number of macroblocks, a macroblock escape, a macroblock address (MBA), a macroblock type, etc., are sequentially contained.

A block layer 441 is a minimum unit of transmission and compression. The block layer 441 includes a necessary IDCT coefficient and ends at an end of block ('EOB'). The EOB is added even when 64 variable length coders ('VLCs') of a coefficient exist. An intra DC uses an individual VLC. The block layer 441 is expressed by a two-dimensional VLC.

FIG. 4B is a view illustrating the layer structure of an MPEG-2 image data. As shown in FIG. 4b, MPEG image data of one frame has the same structure as that of the reference numeral 435. The image data in the frame include a plurality of slices as shown in the reference numeral 437 and each slice includes a plurality of macroblocks having the same structure as that of the reference numeral 439. Further, the macroblock include four blocks having the same structure as that of the reference numeral 441. Herein, since the blocks have sizes of 8*8, the macroblock has the size of 16*16. Further, the GOP layer 433 includes a plurality of picture layers and the sequence layer 431 includes a plurality of GOP layers. Herein, the sequence layer 431 may comprise a moving picture file stored in the image memory 260.

Figure 4C:
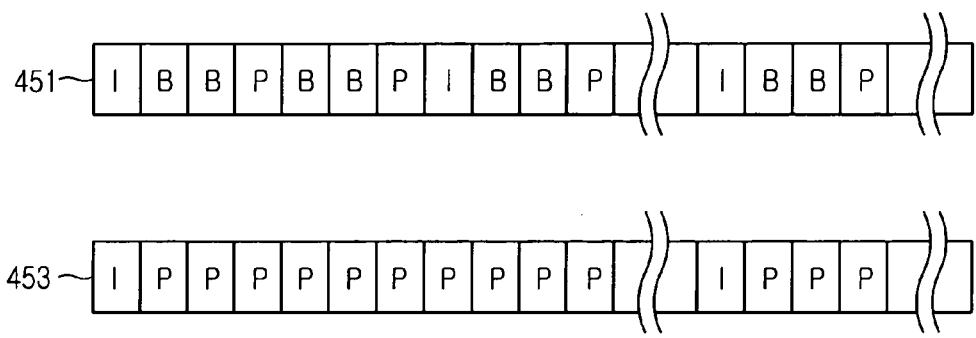

Further, the picture layer 435 is included in the MPEG coding data structure of one frame image data as described above and is coded by one method of an I frame, a B frame and a P frame. Herein, the I frame has a frame structure in which a motion estimation and compensation are not performed and is JPEG-like. In the P frame, motion and difference value is coded with reference to previous frame image data (i.e., I frame and a P frame). Further, the B frame is a frame coded according to relation between a previous frame image and a next frame image. FIG. 4C is a view showing an arrangement example of frames for displaying one screen of an image. Generally, one screen may be constructed within 30 frames. In FIG. 4C, a reference numeral 451 represents the structure of one screen frame when it is assumed that I (N) is 15 frames and B (M) is 3 frames. In such a case, the I frame must be coded at least once for every 15 frames and more than three B frames cannot be continuously coded. Accordingly, when the coding methods of an I frame, a B frame and a P frame are used, the first image codec 250 can code each frame image in the same sequence as that shown in the reference numeral 451. Further, as shown in the reference numeral 453, the first image codec 250 can construct a screen image by means of only the P frame without using the B frame.

FIG. 4A is a diagram illustrating the structure of the moving picture file stored in the image memory 260 in the repetition course of a moving picture storage operation and a temporary pause operation while the procedure of FIG. 3 is performed.

Referring to FIG. 4A, when the record mode is set in step 315 of FIG. 3, the image processing controller 200 operates the first image codec 250 so that photographed moving picture signals are MPEG-coded and stores the MPEG-coded in the image memory 260. Herein, the first image codec 250 codes a frame image signal as shown in the reference numeral 435 of FIG. 4B. Further, the image processing controller 200 converts the frame image signal coded as shown in the reference numeral 435 of FIG. 4B to moving picture files as shown in the reference numerals 433 and 431 of FIG. 4B and stores the moving picture files in the image memory 260.

In an embodiment of the present invention, the moving picture signals are stored while the storage operation and the temporary pause operation are repeated. Accordingly, a plurality of moving picture files having the form as shown in the reference numeral 435 of FIG. 4B are generated. Specifically, in a case in which a time period for which moving picture signals are photographed and stored as shown in the reference numeral 411 of FIG. 4A is a total time period T, when an initial record mode is set, the image processing controller 200 performs a record mode as shown in the reference numeral 413 in step 321. Then, when a user presses a temporary pause key after a time period RT1 elapses, the image processing controller 200 detects that the temporary pause key has been pressed, stops the operation of the first image codec 250, and temporarily pauses an image record. Accordingly, the moving picture signals are stored in the image memory 260 for the time period RT1 and the moving picture signals stored in the image memory 260 become ID1 data as shown in the reference numeral 415. Further, the ID1 data as shown in the reference numeral 415 of FIG. 4A become a moving picture file having the structure as shown in the reference numeral 431 of FIG. 4B. That is, when the temporary pause occurs during the record, the image processing controller 200 converts the moving picture signals stored up to now to the moving picture file having the structure as shown in the reference numeral 431 of FIG. 4B.

Then, when the user presses the moving picture storage key again after a time period PT1 elapses, the image processing controller 200 detects that the moving picture storage key has been pressed in step 327, operates the first image codec 250, and stores the coded MPEG-coded moving picture signals in the image memory 260. Herein, the image processing controller 200 controls the first image codec 250 so that the first frame of a newly stored moving picture signal is coded into an I frame image, converts the coded MPEG-coded moving picture signals to a new moving picture file, and stores the new moving picture file in the image memory 260. Further, the image processing controller 200 forms a link of the previous moving picture file stored for the time period RT1 and the currently stored moving picture file. Herein, the previous moving picture file and the currently stored moving picture file can be converted to the moving picture file as shown in the reference numeral 431 of FIG. 4B and stored in the image memory 260. Further, the image processing controller 200 stores the link information of the moving picture files and can link the moving picture files with reference to the link information when the record function is terminated.

As described above, when the user presses the storage key again in a state in which the record is temporarily paused for the time period PT1 in the reference numeral 413 of FIG. 4A, the image processing controller 200 MPEG-codes moving picture signals photographed before a next temporary pause function is set or a record end function is set and stores the coded moving picture signals in the image memory 260. Further, when a record interval is set for a time period RT2, the image processing controller 200 stores ID2 data in the image memory 260 as shown in the reference numeral 415 of FIG. 4A.

Then, when the temporary pause key is input again, the image processing controller 200 detects the input of the temporary pause key in step 323 and controls the first image codec 250 to stop the coding operation of the moving picture in step 325. That is, the image processing controller 200 temporarily stops the storage of the moving picture signals and performs a preview mode.

As described above, the image processing controller 200 repeats steps 321, 323, 325 and 327 by the repetition input of the temporary pause key and the moving picture storage key, MPEG-codes moving picture signals photographed for the time period RT as shown in the reference numeral 413 of FIG. 4A, stores the coded moving picture signals in the image memory 260. Further, the image processing controller 200 repeats an operation enabling the storage of the image to be temporarily paused for the time period PT. Accordingly, the moving picture signals in the image memory 260 are as shown in the reference numeral 415 of FIG. 4A. Herein, as shown in the reference numeral 417 of FIG. 4A, the first image codec 250 stores the image of the first frame as an I frame and codes the next frame images in the same manner as that shown in the reference numeral 451 or 453 of FIG. 4C according to a predetermined coding method, in a time point at which the record of the image is temporarily paused and then is performed again. Herein, when the record of the moving picture signals is stopped and then is stored again as described above, since the first frame image data do not have correlation with a previous frame, the first frame image data are stored as an I frame.

Then, the image processing controller 200 detects a record end command in step 329 of FIG. 3, the image processing controller 200 converts the moving picture files as shown in the reference numeral 415 of FIG. 4A to one moving picture file as shown in the reference numeral 417 of FIG. 4A and stores the moving picture file. A method converting the moving picture files as shown in the reference numeral 415 of FIG. 4A to one moving picture file as shown in the reference numeral 417 of FIG. 4A may employ a method by which the image processing controller 200 generates link information with the previously generated moving picture file when the moving picture file is generated in the temporary intervals as described above, or a method by which the image processing controller 200 generates a new moving picture file by linking a generated moving picture file to a previous moving picture file.

Figure 5:
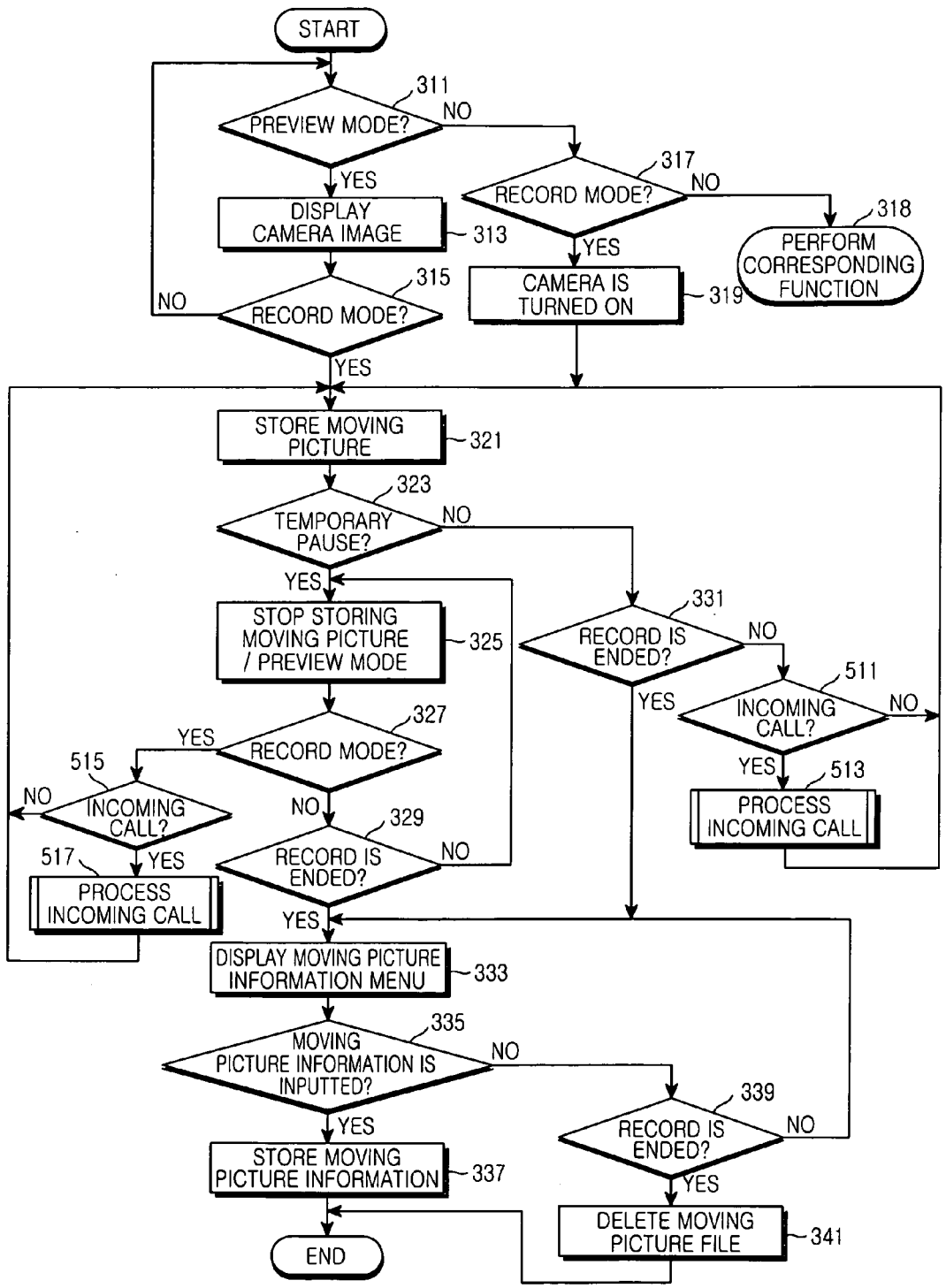
FIG. 5 is a flowchart illustrating a moving picture photographing procedure according to another embodiment of the present invention.

As described above, when the incoming call occurs while the moving picture signals are photographed, the controller 110 processes the incoming call. FIG. 5 is a flowchart illustrating a procedure of processing an incoming call while moving pictures are being recorded according to the embodiment of the present invention.

Referring to FIG. 5, steps 311, 313, 315, 317, 318, 319, 321, 323, 325, 327, 329, 331, 333, 335, 337, 339 and 341 of FIG. 5 are identical to those of FIG. 3. That is, when moving picture signals are recorded in a portable terminal equipped with a camera, previous recorded image data are converted to moving picture files whenever a user sets a temporary pause function, and the recorded moving picture files in this way are converted to one moving picture file and stored in a record end. However, in the case of the portable terminal, when an incoming call occurs while the moving picture signals are being recorded, a recording operation may be stopped. Even in such a case, it is preferred that the temporary pause function is performed while the moving picture signals are being recorded, a moving picture file before the processing of an incoming call and a moving picture file recorded after the processing of the incoming call are synthesized into one moving picture file and stored as shown in FIG. 3. Herein, the incoming call may occur while the moving picture signals are being photographed and recorded, or while a preview mode is performed without recording the moving picture signals due to the performance of the temporary pause function.

First, an operation when the incoming call occurs while the moving picture signals are recorded will be described hereinafter. As described above, when a record mode is set, the image processing controller 200 detects the setting of the record mode in step 315, operates the first image codec 250 in step 321 so that the moving picture signals photographed by the camera module 140 are coded as shown in FIG. 4B, and the coded moving picture signals are stored in the image memory 260. If the incoming call occurs while the photographed moving picture signals are being stored as described above, the controller 110 detects the occurrence of the incoming call in step 511 and notifies the image processing controller 200 of the occurrence of the incoming call. In step 513, the controller 110 and the image processing controller 200 process the incoming call. Herein, the incoming call may be processed by the controller 110. Further, in the record mode of the moving picture signals, the incoming call may also be processed by the image processing controller 200 under the control of the controller 110. Further, in an embodiment of the present invention, when the moving picture record mode is performed, the occurrence of the incoming call is silently reported and whether to process the incoming call or not can be determined by a user. Further, when the user selects the processing of the incoming call, the moving picture files stored in the image memory 260 before the processing of the incoming call are linked to the moving picture signals stored after the processing of the incoming call so that one moving picture file is generated and stored when the processing of the incoming call is ended. In the following description, it is assumed that the controller 110 processes the incoming call and the image processing controller 200 controls a moving picture storage under the control of the controller 110.

Figure 6:
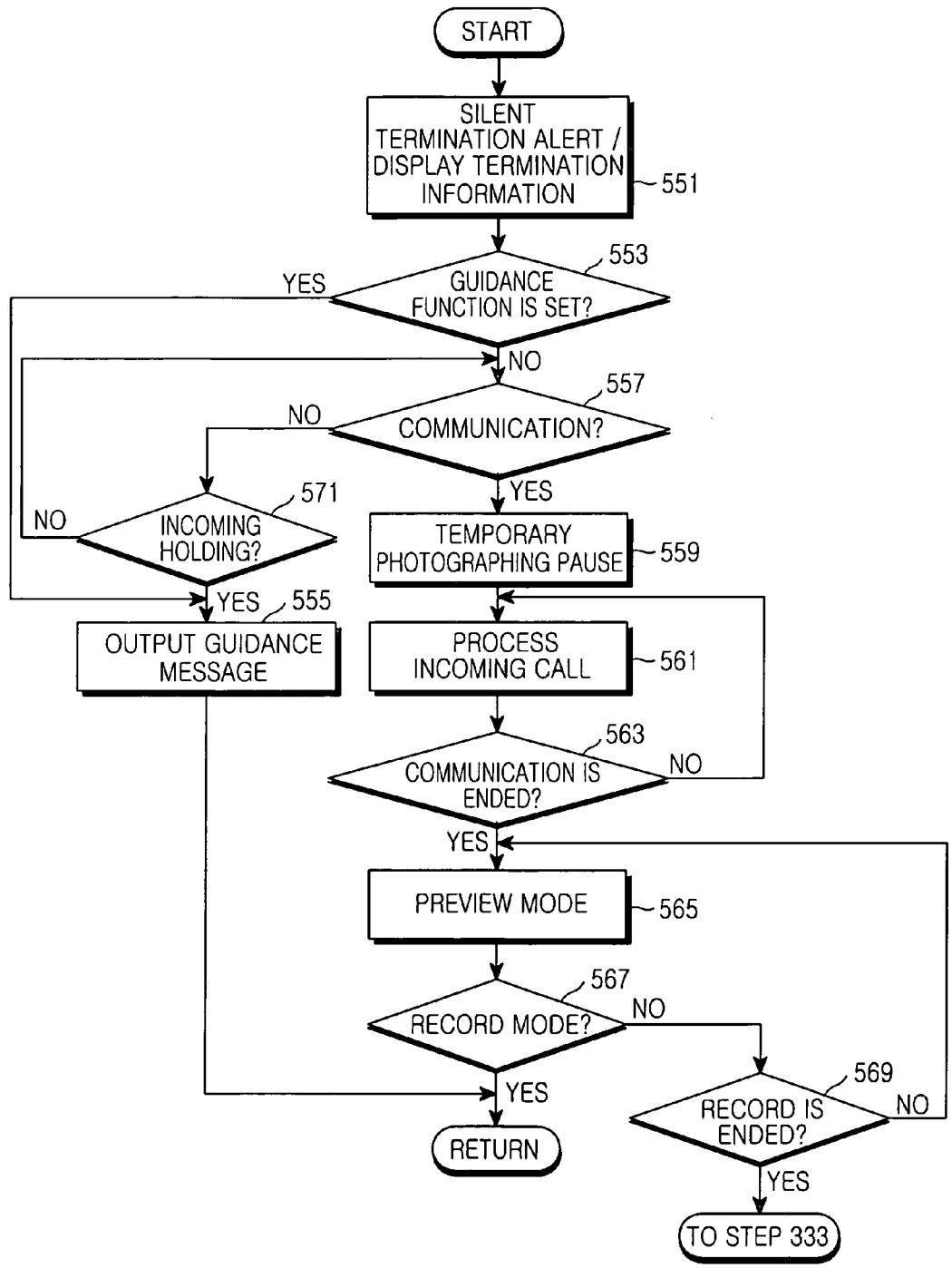
FIG. 6 is a flowchart illustrating an operation procedure of a process in which an incoming call is processed in FIG. 5.

The processing of the incoming signal in step 513 is performed by the procedure as shown in FIG. 6.

Referring to FIG. 6, When the incoming call occurs, the controller 110 generates a silent termination alert in step 551 and displays the received information of a calling party on the display module 160. Herein, for the silent termination alert, either flickering of a termination lamp or flickering of the calling party's information displayed on the display module 160 may be used. The reason for performing the silent termination alert as described above is that an image and an audio being currently photographed are prevented from being affected by the termination alert. That is, when an incoming bell service is performed, the incoming bell may have an influence on the audio of an image being currently photographed. Further, a vibration termination alert vibrates a portable terminal and may have an influence on an image signal.

When the silent termination alert is performed as described above, the controller 110 determines whether or not an incoming guidance function during photographing has been set in step 553. The incoming guidance function during photographing is a function of reporting that a user cannot answer the telephone when the incoming call occurs during the photographing of image signals. That is, a user can record a guidance message in advance to store the guidance message in the memory 130 and can set a voice guidance function during photographing when an image photographing mode is being performed. In such a case, the controller 110 detects the setting of the voice guidance function in step 553 and outputs voice data stored in the memory 130 to the voice synthesizer 129 in step 555. Then, the voice synthesizer 129 converts the voice data to a voice signal and sends the voice signal to the caller through the data processing module 120 and the RF module 123. Further, the controller 110 terminates the processing of the incoming call. When the incoming call is processed in the manner as described above, the image processing controller 200 can continuously photograph image signals without stopping image photographing.

In contrast, when the voice guidance function during photographing has not been set, the controller 110 determines whether or not a communication key is input in a state in which the silent termination alert is performed. Herein, when the user does not set the guidance function during photographing before the photographing of an image, the user can set the guidance function even in a state in which the silent termination alert is generated. In such a case, the user presses an incoming holding key in a state in which the silent termination alert has been generated. Then, the controller 110 detects that the incoming holding key has been pressed in step 571 and proceeds to step 555. That is, the controller 110 generates a message reporting that a user cannot answer the telephone and sends the message to the caller.

In contrast, when the communication key is input in a state in which the silent termination alert has been generated, the controller 110 detects that the communication key has been pressed and informs the image processing controller 200 of the occurrence of the incoming call in step 559. Then, in step 559, the image processing controller 200 controls the camera module 140 and the first image codec 250 to temporarily pause the photographing of the image. Herein, the temporary pause is the same as that in step 323. Further, the operation of the camera module 140 can be paused to stop the preview mode. Then, the controller 110 processes the incoming call in step 561 and the processing of the incoming call is maintained until a communication end key is input in step 563.

When a communication end occurs during the processing of the incoming call, the controller 110 detects the occurrence of the end of the communication in step 563 and informs the image processing controller 200 of the occurrence of the termination of the communication. Then, the image processing controller 200 controls the camera module 140 to perform the preview mode in step 565. Further, when the record mode is generated in the preview mode, the controller 110 detects the generation of the record mode in step 567 and informs the image processing controller 200 of the generation of the record mode. Then, the image processing controller 200 returns to step 321. That is, the image processing controller 200 stores the photographed moving picture in the image memory 260. Even in such a case, the first image codec 250 codes a stored first image frame into an I frame and stores the coded image frame. Further, when the user commands a record end in a state in which the processing of the incoming call has been ended, the image processing controller 200 proceeds to step 333 and determines whether to store the photographed moving picture signals or not.

Next, an operation when the incoming call occurs in a state in which the moving picture signals are processed in a preview mode (i.e., a state in which moving picture signals photographed by the camera module 140 are displayed on the display module 160, but are not stored in the image memory 260) will be described hereinafter. When the temporary pause function is set, the image processing controller 200 detects the setting of the temporary pause function in step 327 and performs the preview mode. In the above state, the controller 110 can process the incoming call by two methods. In one method, a conventional incoming call processing method may be used in the temporary record pause interval. In such a case, since the portable terminal processes the photographed moving picture signals in the preview mode, the portable terminal does not record the moving picture signals. Accordingly, when the incoming call occurs, the controller 110 detects the occurrence of the incoming call in step 515 and can generate an termination alert in a current set method in step 517. In the other method, the incoming call can be processed in the same manner in the image record mode. That is, when detecting the occurrence of the incoming call in step 515, the controller 110 may also process the incoming call by the procedure as shown in FIG. 6 in step 517.

Further, the incoming call processed by the procedure as shown in FIG. 6 can be applied to even a general moving picture photographing mode. That is, FIGS. 3 and 5 show a moving picture photographing mode in which various moving picture signals are converted to one moving picture file and stored while an image photographing function and a temporary pause function are performed. However, even when the incoming call occurs in a state in which a moving picture photographing mode having not the temporary pause function is performed, the incoming call can be processed by the procedure as shown in FIG. 6. In such a case, an operation enabling an image storage to be temporarily paused is performed whenever the incoming call occurs. Further, when moving picture files are processed by the same operation as that in the temporary pause, more than two moving picture signals photographed while the incoming call is processed can be converted to on moving picture file and stored.

Further, in addition to the incoming call, a message may be received while the moving picture is stored. An termination alert in the message reception may be performed in the same method as the alert method when the incoming call occurs. Further, even when the user of the portable terminal generates the originating call while photographing the image, more than two moving picture files may be generated. Accordingly, when the originating call is processed while the moving picture storage mode is performed, the image processing controller 200 can generate one moving picture file by linking moving picture files before the processing of the originating call to moving picture files after the processing of the originating call.

Further, the image processing controller 200 can perform an edition function after the moving picture files have been generated. That is, when the user selects a specific moving picture file stored in the image memory 260 and commands the reproduction of the selected moving picture file, the image processing controller 200 access the selected moving picture file and applies the selected moving picture file to the first image codec 250. Then, the first image codec 250 decodes the coded image data and the scaler 213 adjusts the size of the decoded image data. The adjusted image data are displayed on the display module 160. Herein, when the user selects an edit mode and sets a predetermined interval which is to be deleted in the reproduced moving picture file, the image processing controller 200 deletes moving picture signals of the set interval and links the moving picture file before the deleted interval to the moving picture file after the deleted interval. Therefore, the image processing controller 200 may also generate one moving picture file.

As described above, in an embodiment of the present invention, when moving picture signals photographed by a camera are stored in a portable terminal equipped with the camera, a plurality of moving picture signals are generated according to a user's record and temporary pause command, and the moving picture signals generated by the temporary pause can be converted to one moving picture file at a time point at which the name of a moving picture file is input. Further, in an embodiment of the present invention, when an incoming call or an originating call is processed while moving picture signals are photographed and stored in the portable terminal, a moving picture file recorded before the processing of the call is linked to a moving picture file recorded after the processing of the call, thereby generating one moving picture file. Further, in an embodiment of the present invention, when an incoming call or a message is received while moving picture signals are stored in the portable terminal, a silent alert is generated. Therefore, whether to process a corresponding call or not can be determined by a user without having an influence on currently photographed moving picture signals. Furthermore, in an embodiment of the present invention, when an edit mode and an edit interval are set in reproducing a moving picture file, the moving picture signals of the edited interval are detected and the moving picture file before the edition interval is linked to the moving picture file after the edition interval, thereby generating one moving picture file.

While the invention has been shown and described with reference to certain preferred embodiments thereof, it should be understood by those skilled in the art that various changes in form and details may be made therein without departing from the spirit and scope of the invention as defined by the appended claims.

What is claimed is:

1. A method for storing moving picture image in an apparatus equipped with a camera, the method comprising: a first step of entering a preview mode for enabling the moving picture image photographed by the camera to be displayed when the camera is powered;

a second step of shifting to a moving picture storage mode, coding the photographed moving picture image and storing the coded moving picture image in an image memory when a storage key is input in the preview mode;

a third step of shifting to the preview mode, converting the moving picture image currently stored in the image memory to moving picture files and storing the converted moving picture file when a temporary pause key is input in the moving picture storage mode;

a fourth step of returning to the moving picture storage mode, coding the photographed moving picture image and storing the coded moving picture image in the image memory when the storage key is input in the preview mode shifted from the moving storage mode;

a fifth step of returning to the preview mode, converting the moving picture image currently stored in the image memory to the moving picture file and storing the converted moving picture file when a temporary pause key is input in the moving picture storage mode of the fourth step; and a sixth step of linking up the stored moving picture files via and storing the linked moving picture files as one moving picture file when a record end key is input.

2. The method as claimed in claim 1, wherein the fourth step comprises generating link information of the moving picture files stored in the third step and moving picture files in the fifth step.

3. The method as claimed in claim 1, wherein the sixth step comprises sequentially linking the moving picture files according to the link information to generate one moving picture file and storing the generated moving picture file, when the record end key is input.

4. A method for photographing moving picture image in a portable terminal including a camera and an image processor for processing the moving picture photographed by the camera, the method comprising:

a first step of entering a preview mode for enabling the moving picture image photographed by the camera to be displayed when the camera is driven;

a second step of entering a moving picture storage mode for enabling the moving picture image photographed by the camera to be coded and stored in an image memory when a moving picture storage key is input in the preview mode;

a third step of converting the moving picture image stored in the image memory to moving picture files, storing the moving picture files and returning to the preview mode, when a temporary pause key is input in the moving picture storage mode;

a fourth step of returning to the moving picture storage mode when the moving picture storage key is input in the preview mode; and a fifth step of linking up the moving picture files stored in the image memory to generate one moving picture file and storing the moving picture file, when a record end key is input.

5. The method as claimed in claim 4, wherein the fourth step comprises generating link information of the moving picture files stored in the third step and moving picture files stored in the fifth step.

6. The method as claimed in claim 5, wherein the fifth step comprises sequentially linking the moving picture file according to the link information to generate one moving picture file and storing the generated moving picture file, when the record end key is input.

7. The method as claimed in claim 4, wherein the second step comprises:

generating a silent termination alert and displaying calling party's information when an incoming call occurs in the moving picture storage mode;

converting the moving picture image stored in the image memory to moving picture files, storing the moving picture files and processing the incoming call when a processing of the incoming call is selected, and returning to the preview mode when processing of the incoming call is ended; and ending processing of the incoming call and performing the moving picture storage mode when the processing of the incoming call is rejected.

8. The method as claimed in claim 7, wherein the step of generating a silent termination alert further comprises indicating occurrence of the incoming call by flickering a lamp and reporting that a called party cannot answer the telephone by connecting a voice message recorded in advance to the calling party when the incoming call is rejected.

9. The method as claimed in claim 7, wherein when an incoming call occurs in the moving picture storage mode, a moving picture file generated before the processing of the incoming call and a moving picture file generated after the processing of the incoming call are edited into one moving picture file, and the moving picture file is stored.

10. The method as claimed in claim 4, wherein the step of generating a silent termination alert further comprises indicating occurrence of the incoming call by flickering a lamp and reporting that a calling party cannot answer the telephone by connecting a voice message recorded in advance to the calling party when a voice guidance function has been set in the moving picture storage mode, and keeping the moving picture storage mode.

11. An apparatus equipped with a camera for storing moving picture image comprising:

a keypad adapted to receive commands;

an image memory adapted to store programs and images; and a controller adapted to enter a preview mode for enabling the moving picture image photographed by the camera to be displayed when the camera is powered, shift to a moving picture storage mode, code the photographed moving picture image and store the coded moving picture image in the image memory when a storage key is input in the preview mode, shift to the preview mode, convert the moving picture image currently stored in the image memory to a moving picture file and store the moving picture file when a temporary pause key is input in the moving picture storage mode, return to the moving picture storage mode, code the photographed moving picture image and store the moving picture image in the image memory when the storage key is input in the preview mode, return to the preview mode, convert the moving picture image currently stored in the image memory to the moving picture file and store the moving picture file when the temporary pause key is input, and link up the stored moving picture files to generate one moving picture file and store the generated moving picture file, when a record end key is input.

12. The apparatus as claimed in claim 11, wherein the controller is further adapted to generate link information of previously stored moving picture files and moving picture files to be stored later, code the photographed moving picture image and store the coded moving picture image in the image memory when the storage key is input in the preview mode shifted from the moving picture storage mode.

13. The apparatus as claimed in claim 12, wherein the controller is further adapted to sequentially link up the moving picture files according to the link information to generate one moving picture file and store the generated moving picture file when the record end key is input.

* * * * *

UNITED STATES PATENT AND TRADEMARK OFFICE
CERTIFICATE OF CORRECTION

PATENT NO. : 7,652,692 B2  Page 1 of 1
APPLICATION NO. : 10/975341
DATED : January 26, 2010
INVENTOR(S) : Son et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Twenty-eighth Day of December, 2010

David J. Kappos
*Director of the United States Patent and Trademark Office*